(12) United States Patent
Funke et al.

(10) Patent No.: US 12,065,168 B2
(45) Date of Patent: Aug. 20, 2024

(54) REMOTE ASSISTANCE FOR VEHICLES

(71) Applicant: Zoox, Inc., Foster City, CA (US)

(72) Inventors: Joseph Funke, Redwood City, CA (US); Ravi Gogna, San Jose, CA (US); Caili Li, Castro Valley, CA (US); Steven Cheng Qian, San Francisco, CA (US); Jacob Patrick Thalman, Menlo Park, CA (US); Ruikun Yu, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 106 days.

(21) Appl. No.: 17/462,963

(22) Filed: Aug. 31, 2021

(65) Prior Publication Data
US 2023/0060435 A1    Mar. 2, 2023

(51) Int. Cl.
| | |
|---|---|
| *B60W 60/00* | (2020.01) |
| *B60W 30/095* | (2012.01) |
| *B60W 40/12* | (2012.01) |
| *B60W 50/14* | (2020.01) |
| *G05D 1/00* | (2024.01) |

(52) U.S. Cl.
CPC .... *B60W 60/0018* (2020.02); *B60W 30/0956* (2013.01); *B60W 40/12* (2013.01); *B60W 50/14* (2013.01); *G05D 1/0044* (2013.01); *B60W 2050/146* (2013.01); *B60W 2554/4041* (2020.02); *B60W 2556/45* (2020.02)

(58) Field of Classification Search
CPC ......... B60W 60/0018; B60W 30/0956; B60W 40/12; B60W 50/14; B60W 2050/146; B60W 2554/4041; B60W 2556/45
See application file for complete search history.

(56) References Cited

U.S. PATENT DOCUMENTS 11,099,561 B1    8/2021 Kently-Klay
2018/0284772 A1*  10/2018 Ravichandran ....... B60W 10/04
(Continued)

FOREIGN PATENT DOCUMENTS

KR    20180008593         1/2018
KR    20200112630 A       10/2020

OTHER PUBLICATIONS

"Collision Avoidance up to the Handling Limits for Autonomous Vehicles", Ph.D. thesis (Mechanical Engineering) by J. Funke, Stanford University, (Year: 2015).*

(Continued)

*Primary Examiner* — Peter D Nolan
*Assistant Examiner* — Tanya C Sienko
(74) *Attorney, Agent, or Firm* — Lee & Hayes, P.C.

(57) ABSTRACT

Techniques for providing remote assistance to a vehicle are discussed. The techniques include receiving, from a vehicle, an indication of an event and displaying, on a display and to a user, a portion of an environment including the vehicle. The techniques further determine a valid region in the portion of the environment associated with a location at which the vehicle is capable of navigating. The techniques also display, on the display a footprint of the vehicle, where the footprint is associated with a position and orientation. The techniques further include transmitting the position and orientation of the footprint to the vehicle, which causes the vehicle to traverse in the environment to the position and orientation.

20 Claims, 10 Drawing Sheets

(56) References Cited

U.S. PATENT DOCUMENTS

| | | |
|---|---|---|
| 2018/0345955 A1 | 12/2018 | Kim et al. |
| 2020/0001789 A1* | 1/2020 | Leem ..................... G08G 1/012 |
| 2020/0361462 A1* | 11/2020 | Noguchi ............. B60W 30/143 |
| 2020/0409352 A1 | 12/2020 | Caldwell et al. |
| 2020/0409358 A1 | 12/2020 | Gogna et al. |
| 2020/0409363 A1 | 12/2020 | Gogna et al. |
| 2021/0018908 A1* | 1/2021 | Tokuda ................ B60W 40/08 |
| 2021/0026350 A1 | 1/2021 | Gogna et al. |
| 2021/0107484 A1* | 4/2021 | Green ............... B60W 50/0097 |
| 2021/0114620 A1 | 4/2021 | Yu et al. |
| 2021/0179087 A1* | 6/2021 | Tsujino ................. G08G 1/168 |
| 2022/0073097 A1* | 3/2022 | Sucan .................. G05D 1/0022 |
| 2022/0348204 A1* | 11/2022 | Wang ................. B60W 30/182 |
| 2023/0060500 A1 | 3/2023 | Funke |

OTHER PUBLICATIONS

"Augmenting Self-Driving with Remote Control: Challenges and Directions" by L. Kang et al., ACM; 19th International Workshop on Mobile Computing Systems & Applications, Feb. 12-13, 2018, Tempe , AZ, USA. ACM, New York, NY, USA, 6 pages. (Year: 2018).*

PCT Search Report and Written Opinion mailed Dec. 8, 2022 for PCT application No. PCT/US2022/041071, 12 pages.

Office Action for U.S. Appl. No. 17/463,008, mailed on Mar. 27, 2023, Funke, "Remote Assistance for Vehicles", 23 Pages.

* cited by examiner

REMOTE ASSISTANCE FOR VEHICLES

BACKGROUND

Planning systems in autonomous and semi-autonomous vehicles may determine actions for a vehicle to take in an operating environment. Actions for a vehicle may be determined based in part on avoiding objects present in the environment. The planning systems may allow the vehicle to navigate many situations. However, in some situations, the vehicle may request assistance to perform certain actions or identification of a particular driving destination.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
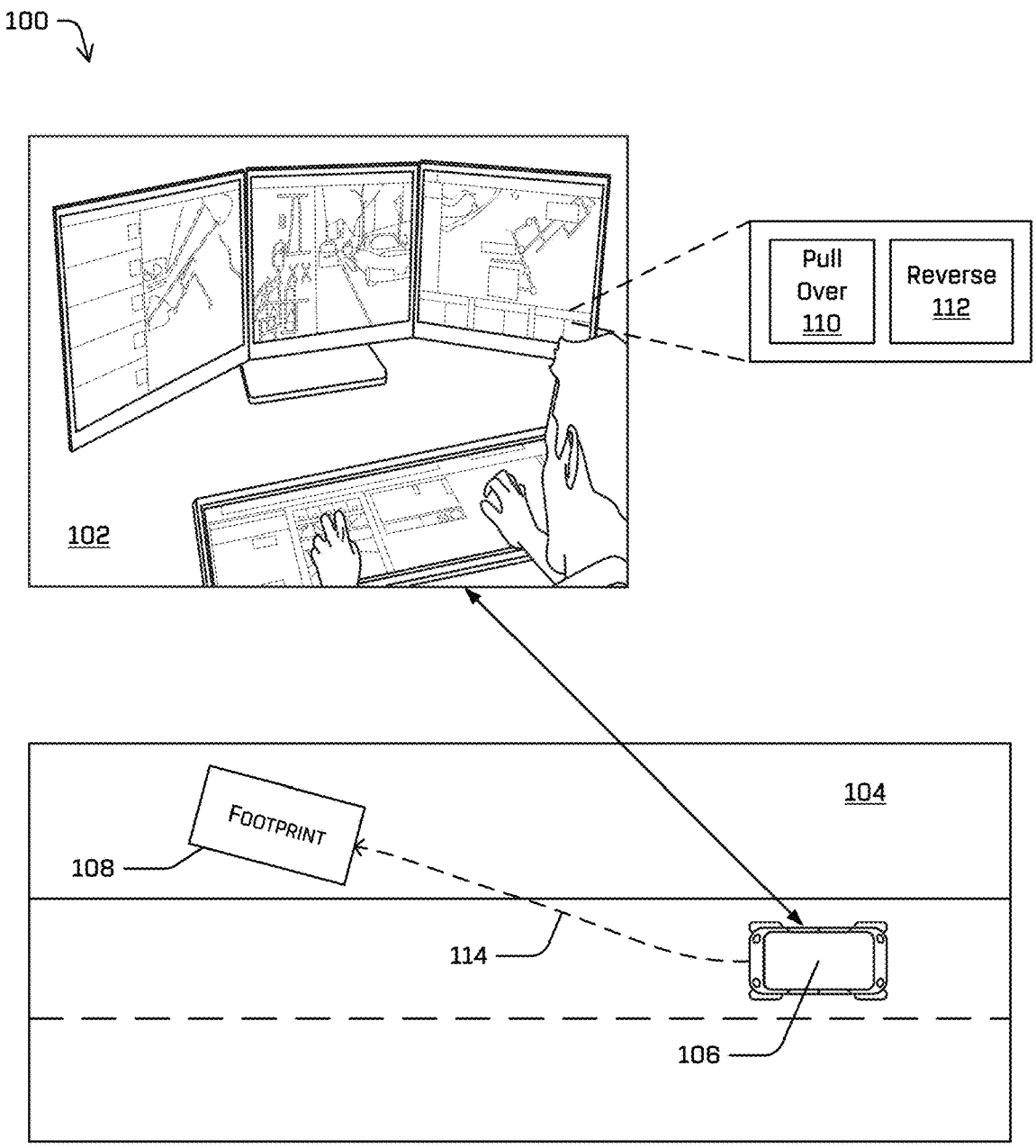
FIG. 1 illustrates an example implementation to provide remote assistance to a vehicle including specifying a vehicle location footprint, in accordance with examples of the disclosure.

This application relates to techniques for providing assistance to a vehicle that needs to pull off of a roadway or needs to back up to move away from an obstacle. In some examples, the vehicle may need to move off of a roadway (e.g., pull over) due to a triggering event (also referred to as an "event"), such as an approaching emergency vehicle, a problem with the vehicle, or a passenger who needs to exit the vehicle. This application describes various systems and methods to assist the vehicle in locating a safe area to pull off from the road. The application also describes systems and methods to assist the vehicle in driving in a reverse direction to create space between the vehicle and an obstacle (e.g., a stopped or parked vehicle) to allow the vehicle sufficient space to drive around the obstacle in a forward direction.

In some examples, the operations attributed to the remote assistance system (or simply "system") may be performed autonomously by the system without user input, or they can be based on input by a user or operator of the system. In some examples, the system may perform certain actions autonomously (e.g., identifying valid or invalid locations for the vehicle to pull over) while other actions are performed based in input of a user (e.g., defining a target footprint at which the vehicle is to pull over).

In some examples, a system receives from a vehicle an indication of a trigger event that involves stopping the vehicle. The system may select a pull over area for the vehicle and determine coordinates associated with the pull over area. The system may also determine a target pose of the vehicle (also referred to as an "orientation") at the pull over area. The coordinates of the pull over area and the target pose of the vehicle can be communicated to the vehicle. When the trigger event is resolved, the system may determine a departure path for the vehicle to pull out onto a roadway and communicate the departure path to the vehicle.

In some examples, a vehicle identifies a trigger event that involves stopping the vehicle. The vehicle may communicate the trigger event to a remote assistance system. The vehicle may also communicate current information about the vehicle and the surrounding area to the remote assistance system. The remote assistance system can identify valid and/or invalid pull over locations for the vehicle using, for example, a graphical user interface (GUI). A user of the remote assistance system may select a vehicle pull over location footprint that includes an x coordinate, a y coordinate, and position (e.g., a target pose (or target orientation) of the vehicle at the footprint). If the selected location is valid, the remote assistance system may communicate the pull over location to the vehicle. The vehicle may then plan a path to the pull over location, drive to the pull over location, and stop at that location. After the trigger event is resolved, the vehicle may reactivate a previous path being followed and create a path for the vehicle to pull out onto the roadway. Alternatively, the user of the remote assistance system may define a path for the vehicle to pull out onto the roadway. The vehicle may then update the previous path based on the vehicle's current location and begin driving by following the updated path.

In some examples, a vehicle may receive, from a remote assistance system, coordinates of a pull over area for the vehicle. The vehicle may also receive a target pose (e.g., one or more of a position and orientation) of the vehicle from the remote assistance system. The vehicle determines a path to the pull over area based on the coordinates of the pull over area and controls the vehicle to navigate the vehicle to the pull over area and position the vehicle such that the vehicle stops in alignment with the target pose. By specifying the location footprint that includes the pose of the vehicle, the techniques described herein enable the system to more accurately and precisely position the vehicle at the pull over location, which increases the safety of passengers and pedestrians in the environment, and also increases the operational efficiency of the vehicle (e.g., avoiding the need to reposition the vehicle after pulling over and/or prior to pulling back out onto the road) and the remote assistance system (e.g., reducing the number of instructions that need to be sent by the system to the vehicle to assist the vehicle). Additionally, in some examples, specifying the location footprint can be performed quickly, which allows the vehicle to quickly exit the roadway to allow an emergency vehicle to pass, allow a passenger to exit the vehicle, or handle any other urgent situation.

In some examples, a system may receive, from a vehicle, an indication that the vehicle is stopped due to an obstacle in the vehicle's path such that the vehicle cannot navigate around the obstacle in a forward direction. The system can select a reverse direction location footprint for the vehicle that is positioned behind the vehicle. The system may also determine coordinates associated with the reverse direction location footprint and determine a target pose of the vehicle at the reverse direction location footprint. The coordinates of the reverse direction location footprint and the target pose of the vehicle may be communicated to the vehicle. The vehicle can then be instructed to drive in a reverse direction to the reverse direction location footprint. In some examples, the vehicle can perform a variety of operations in both a forward and a reverse direction.

In some examples, a vehicle stops near a non-moving obstacle and determines that it cannot navigate around the obstacle in a forward direction. The vehicle may communicate current information about the vehicle and the surrounding area to a remote assistance system. The remote assistance system may indicate valid and/or invalid reverse direction locations to a user via a GUI. The user of the remote assistance system can select a reverse direction location footprint that has an x coordinate, a y coordinate, and orientation information (e.g., a target pose of the vehicle at the footprint). If the location is valid, the remote assistance system may communicate the reverse direction location footprint to the vehicle. The vehicle may then plan a path to the reverse direction location footprint by driving in the reverse direction from the obstacle. The vehicle may drive to the reverse direction location footprint using the path and stop at the reverse direction location footprint. The vehicle may then create a path for the vehicle to drive around the obstacle in a forward direction. Alternatively, the user of the remote assistance system may define a path for the vehicle to drive around the obstacle in a forward direction. The vehicle can then update a previous path based on the vehicle's current location and begin driving by following the updated path.

The described systems and methods can help vehicles, such as autonomous vehicles, safely pull off a roadway when an emergency or other urgent action occurs. In some examples, a user of a remote notification system can quickly identify safe pull over locations for the vehicle using a GUI and/or other tools. The user of the remote notification system can communicate the coordinates of a safe pull over location to the vehicle such that the vehicle can immediately drive to the safe pull over location. These systems and methods allow the vehicle to quickly and safely exit the roadway to allow an emergency vehicle to pass, to stop the vehicle in case of a safety issue, and to allow a passenger to quickly exit the vehicle. Additionally, the described systems and methods may provide a location footprint that includes the pose of the vehicle that precisely positions the vehicle at the pull over location. The footprint and pose information increases the safety of passengers and pedestrians in the operating environment. The footprint and pose information may further increase the efficiency of the vehicle by avoiding the need to reposition the vehicle after pulling over and/or pulling back onto the roadway.

The described systems and methods may also help vehicles, such as autonomous vehicles, get unstuck when they are behind a non-moving obstacle and do not have enough room to navigate around the obstacle in the forward direction. In some examples, a user of a remote notification system may find a safe location for the vehicle to back up (in reverse). Once the vehicle has backed to that location, the vehicle can safely drive around the obstacle in the forward direction. This improves the vehicle operation by providing safety assistance when backing away from the object. Additionally, the described systems and methods may provide a location footprint that includes the pose of the vehicle that precisely positions the vehicle at a safe back up location. This footprint and pose information increases the safety of passengers and pedestrians in the operating environment. The footprint and pose information may further increase the efficiency of the vehicle by avoiding the need to reposition the vehicle after pulling over and/or driving around the obstacle. In at least some examples, such locations may be defined based at least in part on a direction of flow of traffic, a designation that the surface is capable of being driven upon, kinematic and/or dynamic constraints of the vehicle (e.g., turning radius), size of the vehicle, and the like.

The techniques described herein can be implemented in a number of ways. Example implementations are provided below with reference to the following figures. Although discussed in the context of an autonomous vehicle, the methods, apparatuses, and systems described herein can be applied to a variety of systems and are not limited to autonomous vehicles. In another example, the techniques can be utilized in any type of vehicle, robotic system, or any system using data of the types described herein. Additionally, the techniques described herein can be used with real data (e.g., captured using sensor(s)), simulated data (e.g., generated by a simulator), or any combination of the two.

As mentioned above, a vehicle may request assistance from a remote entity or remote system to navigate to a safe pull over location or navigate in a reverse direction away from an obstacle. For example, in situations where the vehicle needs to drive out of the driving lane to make space for an emergency vehicle, the vehicle may request assistance in locating a safe area to pull off from the road. In other examples, if the vehicle is too close to a non-moving obstacle, it may need assistance traveling in the reverse direction to create enough space between the vehicle and the obstacle to allow the vehicle to drive around the obstacle in a forward direction.

The remote entity or remote system may provide assistance to the requesting vehicle by having a remote teleoperator (e.g., a human operator) help the vehicle pull off the road or back up away from an obstacle. In some examples, the remote teleoperator does not control the vehicle. Instead, the remote teleoperator may provide guidance (e.g., a suggested route, waypoints, a suggested pull over area, and the like) and/or relax one or more constraints (e.g., expanding a vehicle drive corridor, temporarily suspending certain driving rules, and the like). The vehicle may then plan a route (or revise an existing route) based on the guidance provided and/or relaxed constraints.

In some examples, teleoperators may be monitoring multiple vehicles simultaneously. Therefore, it is important to provide details regarding where the vehicle is and how it arrived at the current situation. These details may include vehicle location information, the previous path driven by the vehicle, images of the environment surrounding the vehicle, a description of the assistance needed, and the like. In various examples, the remote entity or remote system may provide recommendations to the teleoperator to assist them in providing instructions to the vehicle.

FIG. 1 illustrates an example implementation 100 to provide remote assistance to a vehicle including specifying a vehicle location footprint, in accordance with examples of the disclosure. As illustrated in FIG. 1, a remote assistance system 102 communicates with at least one vehicle 106, such as an autonomous vehicle, operating in an environment 104. Remote assistance system 102 may include computer devices (not shown) that monitor multiple vehicles 106 operating in any number of environments. The computer devices associated with remote assistance system 102 may generate one or more user interfaces, such as GUIs (graphical user interfaces), that support interaction with one or more users who provide remote assistance to vehicle 106 via remote assistance system 102. A user may, via a GUI, receive requests for assistance from vehicle 106, evaluate information received from vehicle 106, and provide recommendations or guidance to vehicle 106 (e.g., stopping location, driving paths, and the like).

In some examples, the GUI associated with remote assistance system 102 may include a "pull over" button 110 and a "reverse" button 112. Pull over button 110 allows a user to initiate a pull over recommendation to vehicle 106. As discussed herein, vehicle 106 may need to quickly find a place to pull over in, for example, an emergency situation such as a vehicle problem, an approaching emergency vehicle (e.g., fire truck, ambulance, police car, and the like), or a passenger wants to exit vehicle 106. If vehicle 106 needs assistance finding a place to pull over, a user of remote assistance system 102 may activate pull over button 110, which causes the GUI to display areas proximate vehicle 106 that are safe to pull over. For example, the GUI may display areas that are valid (e.g., safe) for vehicle 106 to pull over and other areas that are not safe to pull over. The user of remote assistance system 102 selects a valid pull over area for vehicle 106 and places a footprint 108 at the selected pull over location. In some examples, a valid region is dynamically generated as a user of remote assistance system 102 moves a target footprint within a GUI environment. For example, the user of remote assistance system 102 may move a footprint within the GUI environment and the footprint changes color depending on whether the current location of the footprint is valid or invalid. For example, the footprint may be shown as green for valid locations and red for invalid locations). In other examples, the GUI may display multiple candidate footprint locations or target areas from which a user of the remote assistance system can select.

Footprint 108 provides x and y coordinates of the selected pull over location as well as a pose of the vehicle. The information associated with footprint 108 may be communicated to vehicle 106, which instructs vehicle 106 to drive to the footprint 108. For example, vehicle 106 may follow a path 114 to the footprint 108.

In some examples, footprint 108 may be a typical driving area such as a road, driveway, parking lot, and the like. In other examples, footprint 108 may be an area where vehicles do not typically drive, but is safe for a vehicle in a temporary emergency situation, such as gravel areas, yards, sidewalks, and the like. In some examples, vehicle 106 may be constrained against such driving activities during normal operation. However, in emergency situations, an exception can be made to allow driving activities that would not otherwise be permitted.

In some examples, remote assistance system 102 may recommend one or more possible footprints 108 to the user of remote assistance system 102. The user may select one of the recommended footprints 108 or select another location for footprint 108.

As mentioned above, the GUI associated with remote assistance system 102 may include reverse button 112, which allows a user of remote assistance system 102 to initiate a reversing operation. The reversing operation is useful, for example, when vehicle 106 is close to an obstacle that prevents vehicle 106 from continuing to drive in a forward direction. If vehicle 106 needs assistance backing up so it can get around the obstacle while driving forward, a user of remote assistance system 102 may activate reverse button 112, which causes the GUI to display areas proximate vehicle 106 that are safe to drive in a reverse direction. For example, the GUI may display areas in the same lane or adjacent lanes that are valid (e.g., safe) for vehicle 106 to drive in a reverse direction and display other areas that are not safe to drive in a reverse direction. The user of remote assistance system 102 selects a valid reverse destination for vehicle 106 and places a footprint 108 at the selected reverse destination. Footprint 108 provides x and y coordinates of the selected reverse destination as well as a pose of the vehicle. The information associated with footprint 108 may be communicated to vehicle 106, which instructs vehicle 106 to drive to the footprint 108.

Further, though depicted for illustrative purposes as two distinct buttons (operations), it should be appreciated that such a concept may be implemented as a single button (e.g., in which the GUI displays areas around the vehicle in all directions which would be safe to proceed to). Additionally, or alternatively, such intermediate poses of the vehicle may be performed in sequence. As a non-limiting example, a remote operator may first provide a pose slightly in the reverse direction (providing more room for maneuverability) and then subsequently in a forward direction.

In some examples, valid regions for pulling over or reversing may be based on various factors, such as a current vehicle speed, a stopping ability of the vehicle, and current road conditions (e.g., dry, wet, or snow-covered). When selecting valid regions for a vehicle to pull over or reverse, the systems and methods described herein may identify valid regions based on the vehicle's ability to slow down and safely navigate to the region based on the current speed and other factors. If a vehicle is going too fast to safely stop at a particular region, the region will be identified as an invalid region.

Remote assistance system 102 may be included in a teleoperations center that can provide remote assistance to one or more vehicles 106. Additional details of determining when to contact a teleoperator as well as techniques for navigating the autonomous vehicle using instructions that are received from the teleoperator are described in U.S. patent application Ser. No. 16/457,289, filed Jun. 28, 2019, entitled "Techniques for Contacting a Teleoperator," which is incorporated herein by reference. Additional details of navigating the autonomous vehicle using instructions that are received from the teleoperator are further described in U.S. patent application Ser. No. 16/457,341, filed Jun. 28, 2019, entitled "Techniques for Navigating Vehicles using Teleoperations Instructions," which is incorporated herein by reference. Additional details of providing teleoperation instructions to an autonomous vehicle are further described in U.S. patent application Ser. No. 16/523,809, filed Jul. 26, 2019, entitled "System and Method for Providing a Teleoperation Instruction to an Autonomous Vehicle," which is incorporated herein by reference.

Figure 2A:
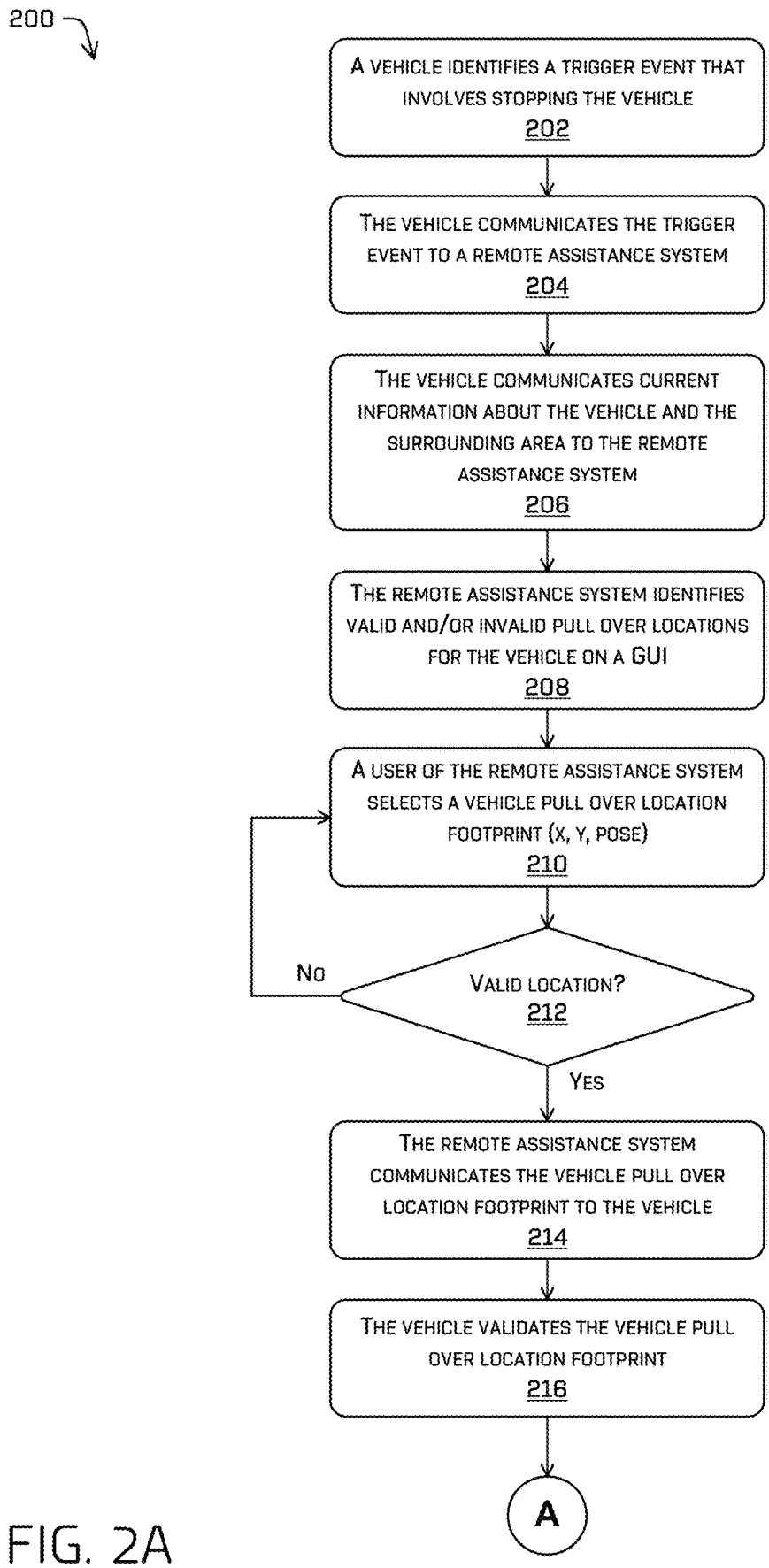
FIGS. 2A and 2B illustrate an example process for providing remote assistance to a vehicle including specifying a vehicle location footprint, in accordance with examples of the disclosure.
Figure 2B:
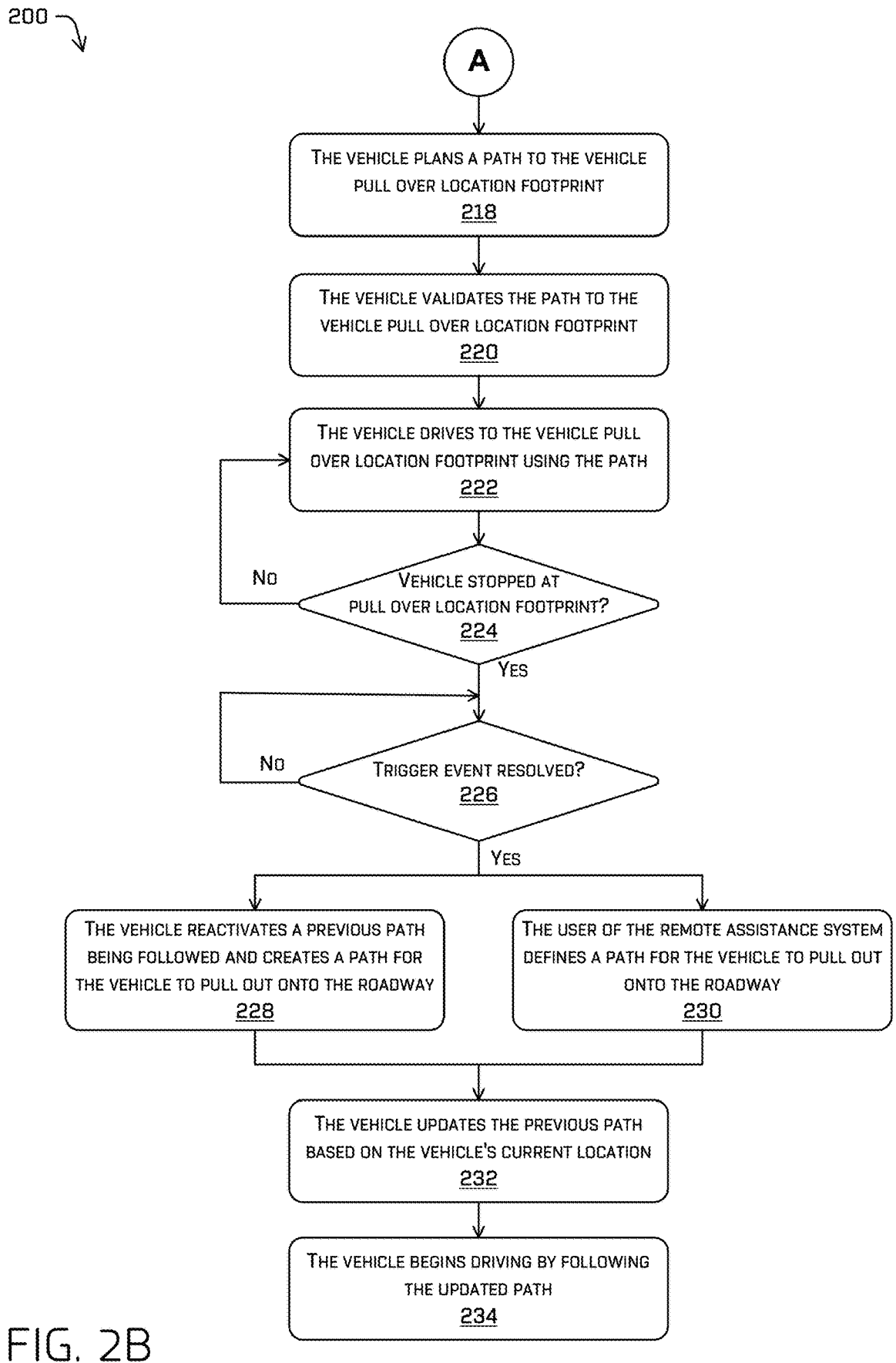

FIGS. 2A and 2B illustrate an example process 200 for providing remote assistance to a vehicle including specifying a vehicle location footprint, in accordance with examples of the disclosure. The operations described herein with respect to the process 200 may be performed by various components and systems, such as the components and systems discussed herein.

By way of example, the process 200 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 200. In some examples, multiple branches represent alternate implementations that may be used separately or in combination with other operations discussed herein.

At operation 202, the process may include a vehicle identifying a trigger event that involves stopping the vehicle. A trigger event may include, for example, an approaching emergency vehicle (e.g., fire truck, ambulance, police car, and the like), a problem with the vehicle (e.g., malfunctioning engine or other vehicle component), or other situation that requires the vehicle to pull over and stop for one or more safety reasons.

At operation 204, the process may include the vehicle communicating the trigger event to a remote assistance system, such as remote assistance system 102 discussed with respect to FIG. 1.

At operation 206, the process may include the vehicle communicating current information about the vehicle and the surrounding area to the remote assistance system. This current information may include the cause of the trigger event, the current location of the vehicle, images of the environment surrounding the vehicle, and the like. Such information may comprise, for example, a state of the vehicle (e.g., position, velocity, acceleration, orientation, etc.), sensor data from one or more sensors associated with the vehicle (as described herein), representations of such sensor data (e.g., bounding boxes, segmentation data, etc.), internal messages generated by the vehicle (e.g., trajectory information, planning information, perception information, etc.), and the like.

At operation 208, after the user of the remote assistance system activates a pull over button (e.g., pull over button 110 in FIG. 1), the process may include the remote assistance system identifying valid and/or invalid pull over locations for the vehicle on a GUI. Valid pull over areas may include surfaces that a vehicle can drive upon and are free of obstructions. Invalid pull over areas may include non-drivable surfaces, areas blocked by obstacles, and the like. In some examples, the GUI may distinguish valid and invalid pull over locations using different colors or other visual indicators to identify the valid pull over locations to the user of the remote assistance system. For example, invalid pull over locations may be shown as red and valid pull over locations may be shown as green. In some examples, a valid pull over location can be safely driven upon by the vehicle. Valid locations may include driving surfaces that are paved, gravel, grass, or otherwise suitable for a vehicle to drive upon. Valid locations are typically free of obstacles that block a vehicle, such as fences, walls, plants, trees, buildings, other vehicles, and the like. In at least some examples, such valid locations may comprise locations in which the vehicle is constrained from driving upon in nominal driving conditions (e.g., based on policy constraints). As non-limiting examples, sidewalks, medians, unpaved areas, and the like may be avoided during nominal driving, though may be used for pulling off in an emergency situation or other event as defined herein.

At operation 210, the process may include a user of the remote assistance system selecting a vehicle pull over location footprint that is defined by an x coordinate, a y coordinate, and a pose of the footprint. In some examples, the user of the remote assistance system may select the vehicle pull over location footprint by positioning a graphical representation of the footprint on a map displayed in the GUI. In some examples, the remote assistance system may recommend one or more possible footprints to the user of the remote assistance system. The user of the remote assistance system may select one of the recommended footprints or select another location for the footprint. In some examples, the x coordinate and y coordinate of the vehicle pull over location footprint may be determined from a map of an environment in which the vehicle is operating. In various examples, such a footprint may comprise an area dimensioned in reference to the vehicle. In at least some such examples, such a footprint may comprise a safety buffer (e.g., 0.25 m, 0.5 m, 1 m, etc.) around the periphery of the area associated with the vehicle. As such, a remote operator may easily glean whether the vehicle will fit in the valid locations. In some examples, a user of the remote assistance system may be an occupant of the vehicle.

At operation 212, the process may include determining whether the vehicle pull over location footprint is positioned in a valid pull over area. If the vehicle pull over location footprint is positioned in an invalid area, process 200 returns to operation 210 where the user of the remote assistance system can select another vehicle pull over location footprint. Of course, in some examples, such a system may preclude a user from selecting the invalid choice in 210.

At operation 214, the process may include the remote assistance system communicating the vehicle pull over location footprint to the vehicle. This communication may include the x coordinate, they coordinate, and the pose of the footprint. In some examples, the remote assistance system may also send an instruction to the vehicle to temporarily suspend at least one driving rule associated with controlling operation of the vehicle to permit the vehicle to navigate to the pull over area.

At operation 216, the process may include the vehicle validating the vehicle pull over location footprint. For example, the vehicle may determine whether it can safely navigate to the vehicle pull over location footprint. If the vehicle pull over location footprint is not validated, the process may request the remote assistance system to provide another vehicle pull over location footprint.

At operation 218, the process may include the vehicle planning a path to the vehicle pull over location footprint based on the vehicle's current location, speed, and trajectory.

At operation 220, the process may include validating the path to the vehicle pull over location footprint. For example, the vehicle may determine whether the vehicle can safely navigate the planned path to the vehicle pull over location footprint. If the path is not validated, the process may request the remote assistance system to provide another vehicle pull over location footprint.

At operation 222, the process may include the vehicle driving to the vehicle pull over location footprint using the path determined at operation 218.

At operation 224, the process may include determining whether the vehicle has stopped at the correct pull over location footprint (e.g., the location defined by the vehicle pull over location footprint coordinates and pose). If the vehicle has not yet stopped at the correct pull over location, process 200 returns to operation 222 and continues until the vehicle stops at the correct pull over location.

At operation 226, the process may include determining whether the trigger event has resolved. For example, if the trigger event is to pull over to allow an emergency vehicle to pass, the trigger event may be resolved after the emergency vehicle has passed the vehicle and is a significant distance from the vehicle. If the trigger event is still active (e.g., not yet resolved), process 200 returns to operation 226 and waits until the trigger event is resolved. In additional or alternative examples, operations may return to 210 for the user to provide an additional location. Determining whether the trigger event has been resolved may be performed by the vehicle or the remote assistance system.

When the trigger event has resolved and the vehicle is ready to pull out of the pull over location and onto the roadway, a path can be determined by the vehicle (operation 224) or by a user of the remote assistance system (operation 226).

At operation 228, the process may include the vehicle reactivating a previous path being followed and creating a path for the vehicle to pull out onto the roadway from the pull over location.

At operation 230, the process may include the user of the remote assistance system defining a path for the vehicle to pull out onto the roadway from the pull over location.

At operation 232, the process may include the vehicle updating the previous path (e.g., prior to encountering the trigger event) based on the vehicle's current location. The vehicle may update the previous path using the new path created by the vehicle at operation 224 or the path defined by the user of the remote assistance system at operation 226.

At operation 234, the process may include the vehicle beginning to drive by following the updated path.

In some examples, the vehicle stays in an autonomous operating mode during the pull over activities. By staying in an autonomous operating mode, the vehicle can continue to watch for obstacles and make any necessary driving adjustments to avoid adverse events with pedestrians, objects, other vehicles, and the like. In some examples, the remote assistance system may define a vehicle pull over location footprint and instruct the vehicle to stay within the footprint. The footprint may be slightly larger than the vehicle to allow the vehicle to move slightly as needed.

In some examples, the vehicle's speed may be reduced upon identification of the trigger event. This reduction in the vehicle's speed may provide additional time to the user of the remote assistance system to identify a valid pull over location for the vehicle and communicate the pull over location information to the vehicle.

In some examples, the remote assistance system may set a reduced speed limit for the vehicle when performing any type of pull over or reversing activity, such as the activities discussed herein.

The example of FIG. 2 discusses providing remote assistance to a single vehicle. In other examples, if multiple vehicles are moving along the same roadway in the same direction, a user of the remote assistance system may collectively help the multiple vehicles pull off the road. For example, if two vehicles are driving in the same direction and both need to pull off the road because of an approaching emergency vehicle, the user of the remote assistance system may provide footprints for both vehicles at the same time to quickly allow both vehicles to pull off the roadway. In various examples, the remote assistance system may automatically provide two footprints (one for each vehicle) that the user of the remote assistance system can select to automatically send the appropriate x, y coordinates and pose information to each of the vehicles simultaneously.

In some examples, the remote assistance system may provide a suggested pull over footprint for a vehicle, but the vehicle may choose a different footprint based on the vehicle's own prediction, planning, and navigation systems. For example, the vehicle may receive x, y coordinates and pose information for a particular footprint, but the vehicle may change the x, y coordinates and/or pose information slightly to allow for easier driving off of the roadway or to provide for easier driving back onto the roadway after the trigger event has been resolved.

Figure 3:
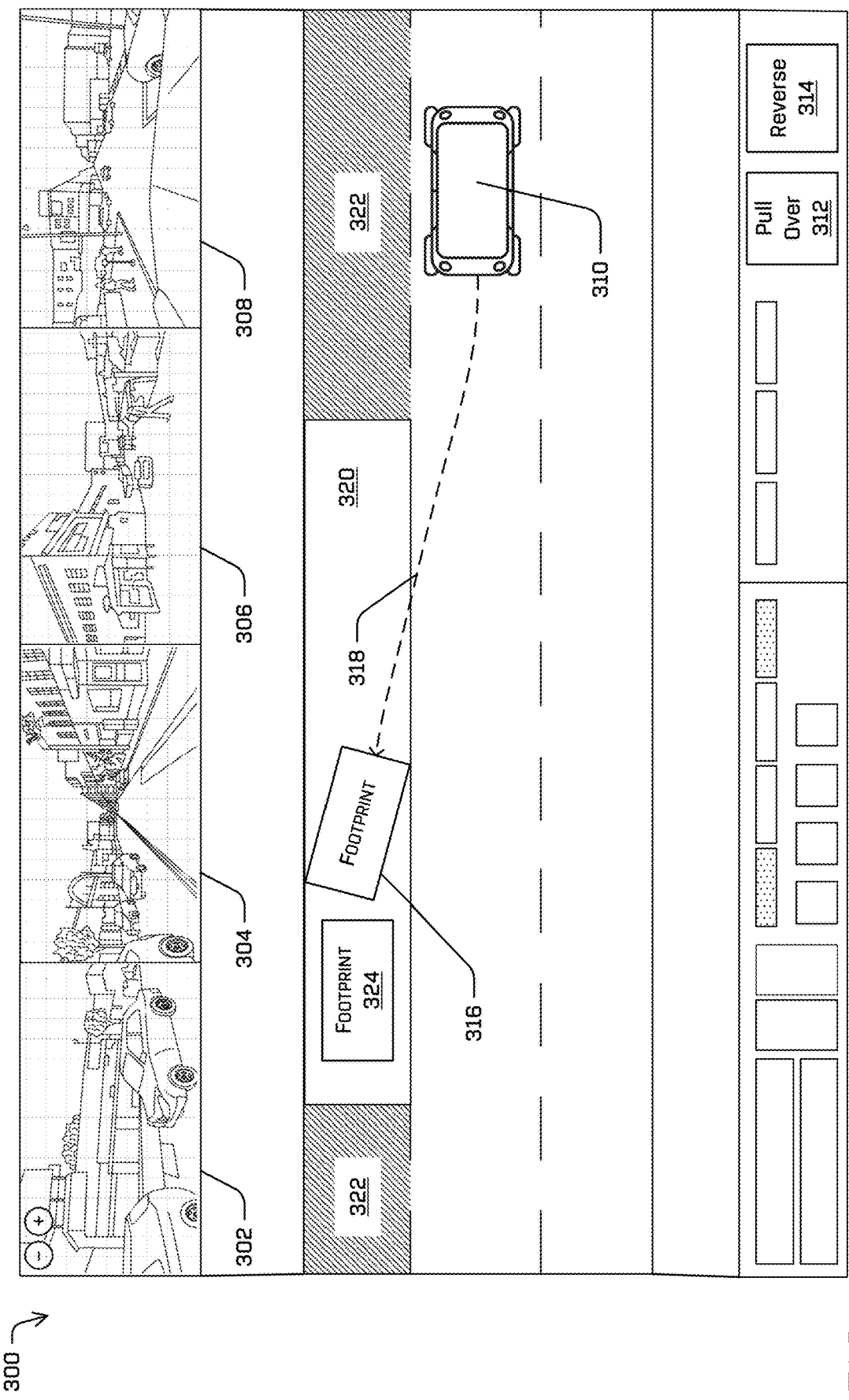
FIG. 3 illustrates an example user interface associated with a remote assistance system, in accordance with examples of the disclosure.

FIG. 3 illustrates an example user interface 300 associated with a remote assistance system, in accordance with examples of the disclosure. In some examples, user interface 300 is a GUI presented to a user of a remote assistance system (such as remote assistance system 102 of FIG. 1). The user interface 300 includes one or more images 302, 304, 306, and 308 of areas surrounding a vehicle 310. In some examples, image 302 may represent a view looking to the left from vehicle 310, image 304 may represent an image looking forward from vehicle 310, image 306 may represent an image looking to the right from vehicle 310, and image 308 may represent an image looking rearward from vehicle 310. Images 302, 304, 306, and 308 provide visual information to a user of the remote assistance system representing the area around a vehicle, which may be used by the user to identify pull over locations and/or reversing locations.

In some examples, user interface 300 includes a "pull over" button 312 and a "reverse" button 314. As discussed herein, activation of pull over button 312 by a user of the remote assistance system may present a GUI that lets the user identify a valid (e.g., safe) location for vehicle 310 to pull over in the event of an emergency situation or other trigger event. Similarly, activation of reverse button 314 by a user of the remote assistance system may present a GUI that lets the user identify a valid location for reversing vehicle 310, for example, to help vehicle 310 back up so it can navigate around an obstacle. In some examples, pull over button 312 and reverse button 314 may be combined in a single control associated with interface 300.

In the example of FIG. 3, vehicle 310 has detected a trigger event and requested assistance from the remote assistance system to find a safe pull over location. FIG. 3 illustrates a valid location 320 and invalid locations 322. In this example, a vehicle pull over location footprint 316 was identified by a user of the remote assistance system and communicated to vehicle 310. FIG. 3 illustrates another possible vehicle pull over location footprint 324 that was not selected by the user of the remote assistance system. Particular examples may present any number of possible footprints 324 that may be selected by a user of the remote assistance system. Based on the location of vehicle 310 and the location of vehicle pull over location footprint 316, vehicle 310 determines a path 318 to drive to vehicle pull over location footprint 316.

Figure 4:
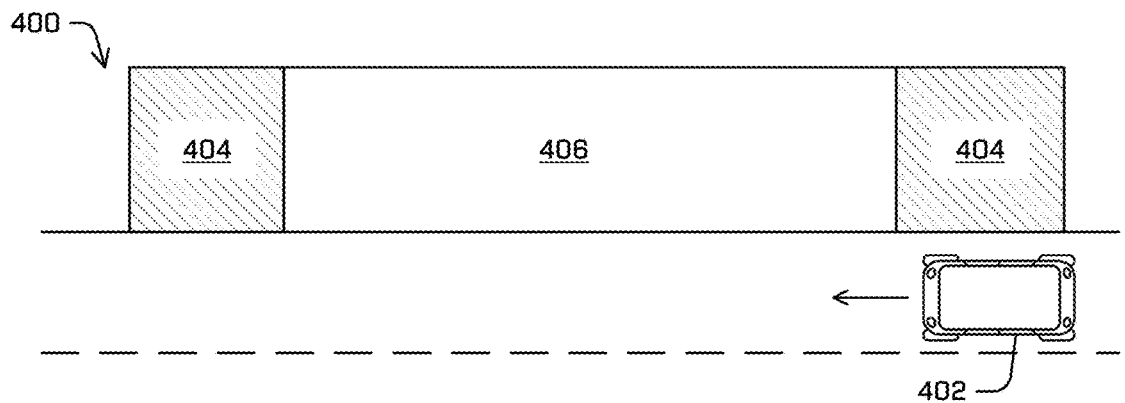
FIGS. 4-6 illustrate an example sequence of actions related to a vehicle pull over activity, in accordance with examples of the disclosure.
Figure 5:
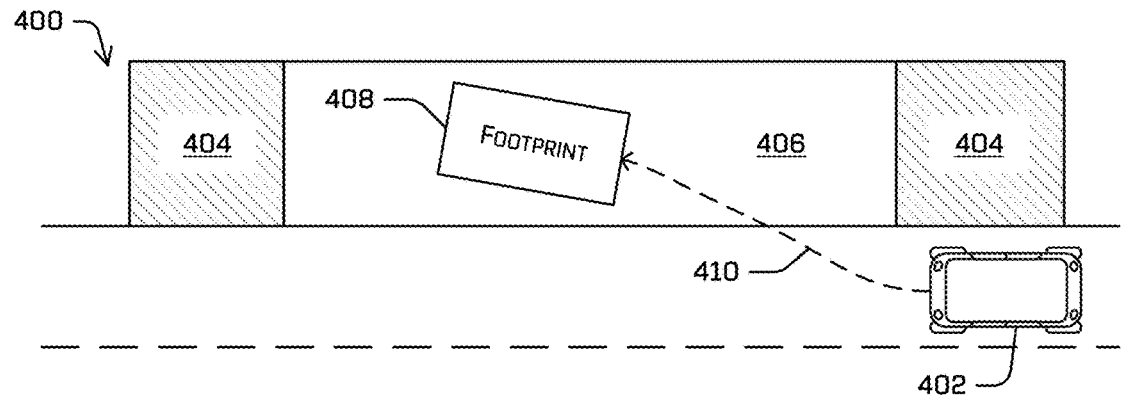
Figure 6:
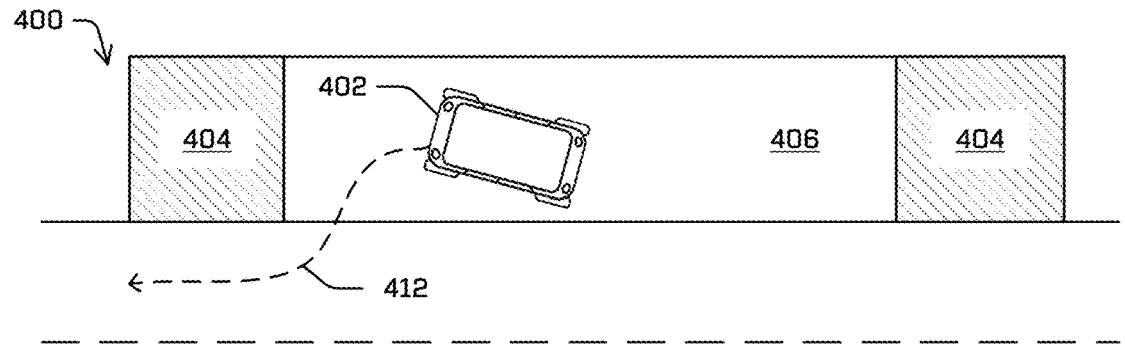

FIGS. 4-6 illustrate an example sequence of actions related to a vehicle pull over activity, in accordance with examples of the disclosure. For example, in FIG. 4 a vehicle 402 is operating in an environment 400. As shown in FIG. 4, vehicle 402 is traveling along a road in the direction indicated by the arrow pointing to the left. When vehicle 402 is in the position shown in environment 400, vehicle 402 identifies a trigger event that requires vehicle 402 to pull off the road. In this example, the trigger event is an approaching fire truck that needs vehicle 402 to move out of the main roadway.

In the example of FIG. 4, vehicle 402 communicates the trigger event to a remote assistance system (e.g., remote assistance system 102 shown in FIG. 1) requesting guidance on where to pull over so the fire truck can pass. The environment 400 includes invalid pull over areas 404 and a valid pull over area 406. In some examples, invalid pull over areas 404 and valid pull over area 406 may be displayed to a user of the remote assistance system (e.g., displayed on a GUI for viewing by the user). In some examples, invalid pull over areas 404 and valid pull over area 406 may be shown on a GUI as different colors, different textures, or other distinguishing characteristics so the user of the remote assistance system can easily identify valid areas for vehicle 402 to pull over. The user of the remote assistance system may select a location in valid pull over area 406 for vehicle 402 to pull off from the roadway.

In the example of FIG. 5, the user of the remote assistance system has selected a location in valid pull over area 406 for vehicle 402 to pull over. The specific location in the valid pull over area 406 is identified with a vehicle pull over location footprint 408. As discussed herein, the remote assistance system identifies x and y coordinates of vehicle pull over location footprint 408 as well as a pose of the vehicle. The information associated with vehicle pull over location footprint 408 may be communicated to vehicle 402, which instructs vehicle 402 to drive to vehicle pull over location footprint 408. In some examples, vehicle 402 calculates a path to vehicle pull over location footprint 408 using the received x and y coordinates and the pose information. As shown in FIG. 5, vehicle 402 calculates a path 410 from its current location to vehicle pull over location footprint 408.

In the example of FIG. 6, vehicle 402 has stopped at vehicle pull over location footprint 408. After the fire truck has passed, it may be safe for vehicle 402 to pull back on to the roadway. In this situation, vehicle 402 calculates a path 412 from its stopped location back onto the roadway. Path 412 may be executed as soon as traffic on the roadway has cleared and vehicle 402 can safely drive back onto the roadway.

Figure 7A:
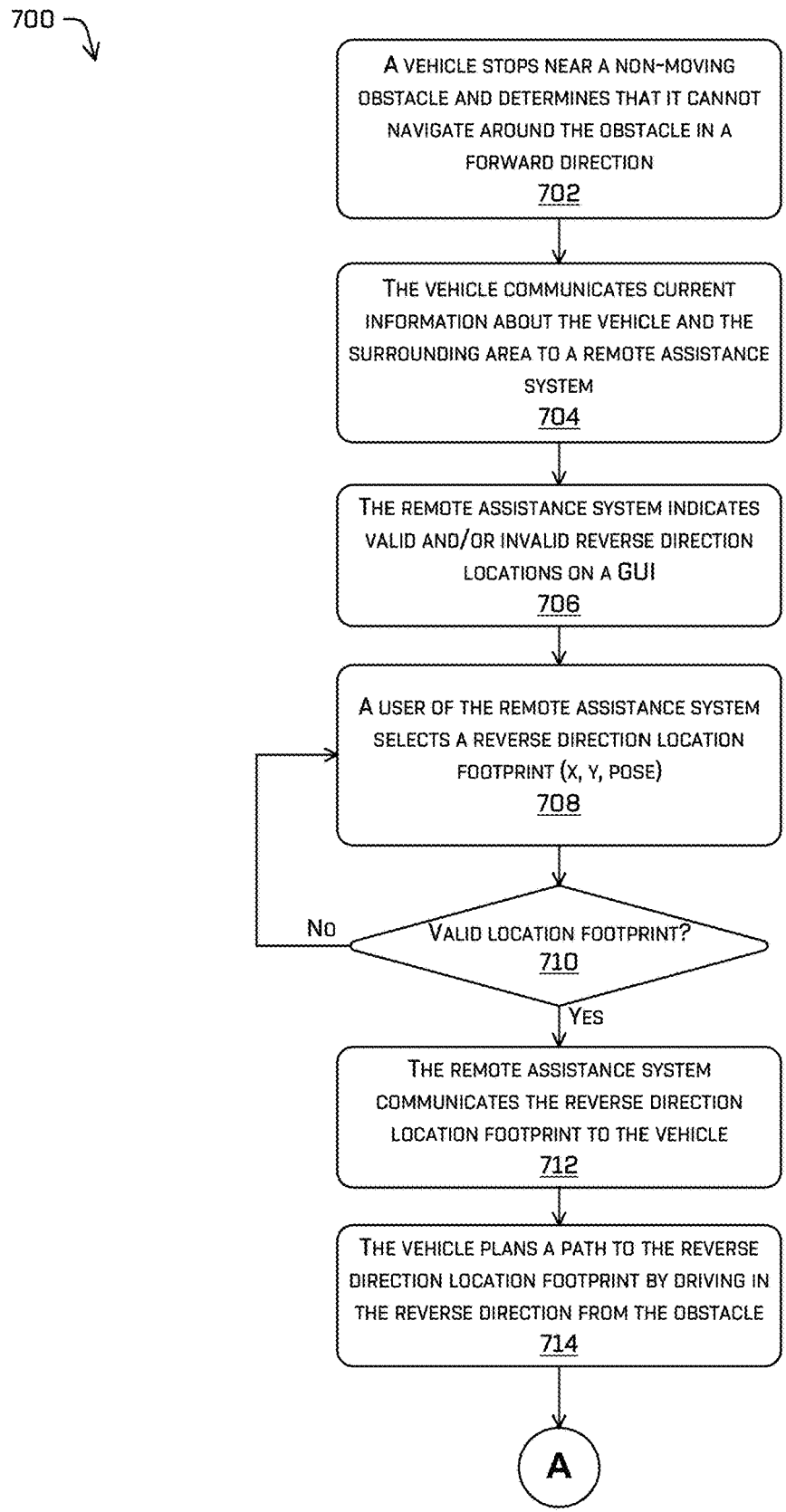
FIGS. 7A and 7B illustrate an example process for providing remote assistance to a vehicle including specifying a vehicle location footprint, in accordance with examples of the disclosure.
Figure 7B:
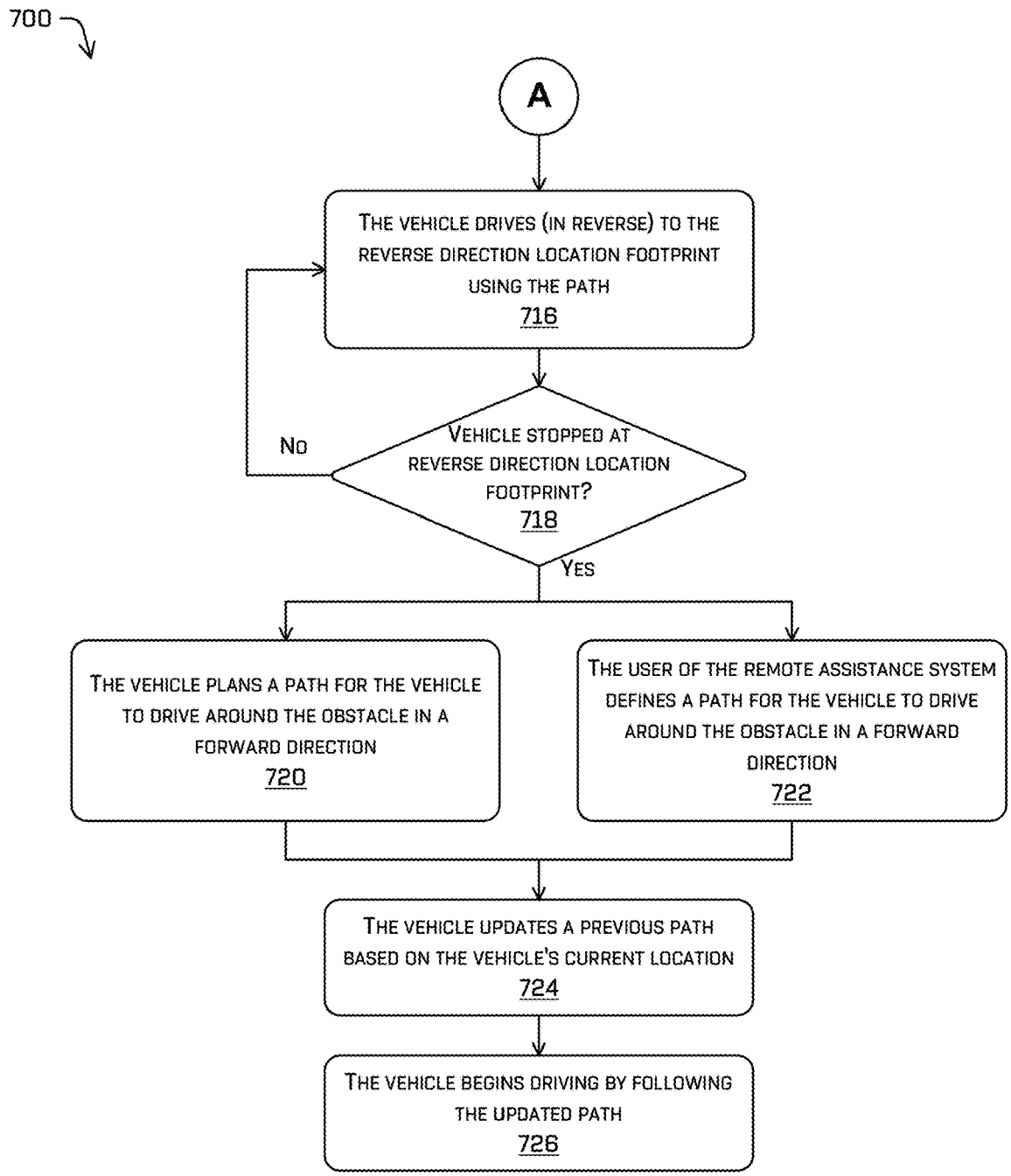

FIGS. 7A and 7B illustrate an example process 700 for providing remote assistance to a vehicle including specifying a vehicle location footprint, in accordance with examples of the disclosure. The operations described herein with respect to the process 700 may be performed by various components and systems, such as the components and systems discussed herein.

By way of example, the process 700 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 700. In some examples, multiple branches represent alternate implementations that may be used separately or in combination with other operations discussed herein.

At operation 702, the process may include a vehicle stopping near a non-moving obstacle and determining that the vehicle cannot navigate around the obstacle in a forward direction. The obstacle may be a stopped vehicle, a double-parked vehicle, a non-vehicle object such as a box or item that fell off a truck, and the like. In some examples, the obstacle may be another vehicle that is backing up toward the vehicle.

At operation 704, the process may include the vehicle communicating current information about the vehicle and the surrounding area to a remote assistance system. Along with this information, the vehicle may communicate a request for assistance from the remote assistance system in backing away (e.g., in a reverse direction) from the obstacle.

At operation 706, the process may include the remote assistance system indicating valid and/or invalid reverse direction locations on a GUI. As discussed herein, the valid and invalid locations may be represented in the GUI as different colors, different textures, and the like. The reverse direction locations indicate areas behind the vehicle to which the vehicle can safely navigate while reversing.

At operation 708, the process may include a user of the remote assistance system selecting a reverse direction location footprint that includes x and y coordinates as well as pose information associated with the reverse direction location footprint. In some examples, the x and y coordinates of the reverse direction location footprint may be determined from a map of an environment in which the vehicle is operating. In some examples, selecting a reverse direction location footprint is located behind the vehicle relative to a most recent direction of travel of the vehicle.

At operation 710, the process may include determining whether the selected reverse direction location is a valid location footprint. For example, operation 710 may determine whether the location footprint is one that the vehicle can safely navigate to while reversing.

At operation 712, the process may include the remote assistance system communicating the reverse direction location footprint to the vehicle. This information may include the x and y coordinates as well as the pose or orientation information associated with the footprint. In some examples, the remote assistance system may also send an instruction to the vehicle to temporarily suspend at least one driving rule associated with controlling operation of the vehicle to permit the vehicle to navigate to the reverse direction location footprint. As discussed above with respect to FIGS. 2A and 2B, the vehicle may validate the reverse direction location footprint. If the footprint is not validated, the vehicle may request another reverse direction location footprint from the remote assistance system.

At operation 714, the process may include the vehicle planning a path to the reverse direction location footprint by driving in a reverse direction from the obstacle. As discussed above with respect to FIGS. 2A and 2B, the vehicle may validate the path to the reverse direction location footprint. If the path is not validated, the vehicle may request another reverse direction location footprint from the remote assistance system.

At operation 716, the process may include the vehicle driving (in reverse) to the reverse direction location footprint using the path created at operation 714. In some examples, the vehicle may change from a forward mode of operation to a reverse mode of operation by performing a "gear change" which may include a physical gearing system or a software control system.

At operation 718, the process may include determining whether the vehicle is stopped at the reverse direction location footprint. If the vehicle has not yet stopped at the reverse direction location footprint, process 700 returns to operation 716 while the vehicle continues driving to the reverse direction location footprint. In some examples, process 700 may determine whether the vehicle has moved far enough away from the obstacle to safely navigate around the obstacle in a forward direction. If the vehicle has sufficient distance from the obstacle, operation 718 may be determined to be satisfied and process 700 may continue to operations 720/722 even though the reverse direction location footprint has not been reached.

At operation 720, the process may include the vehicle planning a path for the vehicle to drive around the obstacle in a forward direction.

At operation 722, the process may include an alternate approach where the user of the remote assistance system defines a path for the vehicle to drive around the obstacle in a forward direction.

At operation 724, the process may include the vehicle updating a previous path (e.g., prior to encountering the obstacle) based on the vehicle's current location.

At operation 726, the process may include the vehicle beginning to drive forward by following the updated path.

In examples, a reversing tool associated with the remote assistance system may provide a visual indicator or other notification that a vehicle has backed far enough away from an obstacle to enable the vehicle to drive around the obstacle in the forward direction. In this situation, a vehicle may not need to complete the reversing path to the footprint. Instead, the vehicle may stop its reversing activity and resume forward travel when traffic on the roadway supports the forward travel activity.

In some examples, if the vehicle trying to back up has another vehicle close behind, the vehicle may consider activating its backup lights to see if the vehicle close behind will move. Otherwise, the remote assistance system may look for another way to get the vehicle unstuck from its current location, which may include multiple forward and backward movements to move around the non-moving obstacle.

Figure 8:
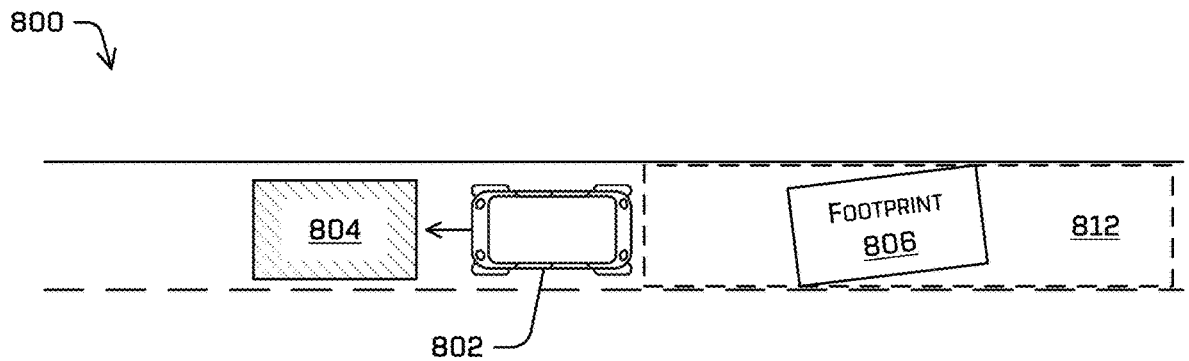
FIGS. 8-10 illustrate an example sequence of actions related to a vehicle reversing activity, in accordance with examples of the disclosure.
Figure 9:
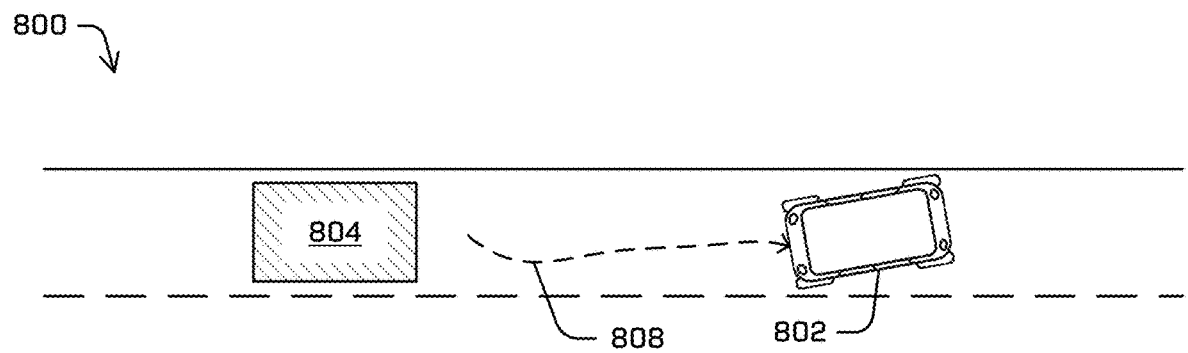
Figure 10:
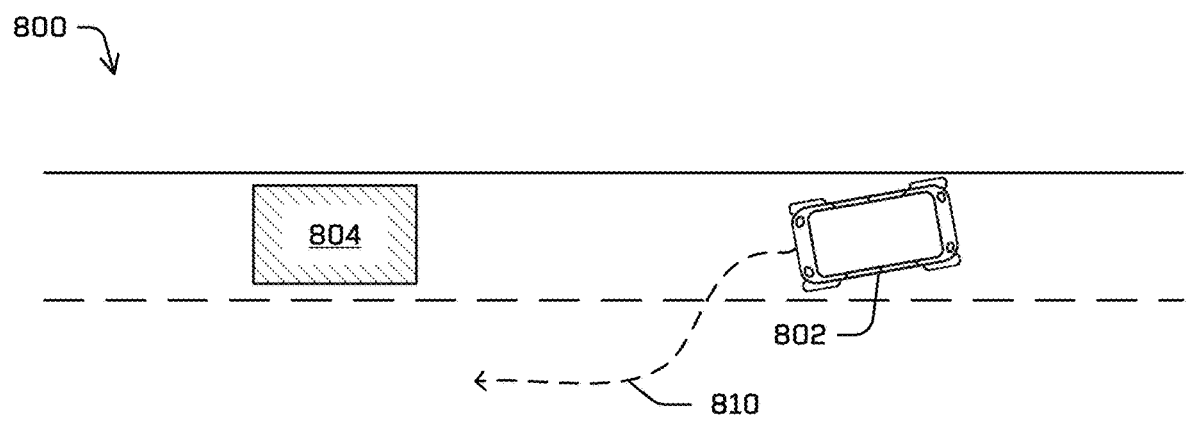

FIGS. 8-10 illustrate an example sequence of actions related to a vehicle reversing activity, in accordance with examples of the disclosure.

For example, in FIG. 8 a vehicle 802 is operating in an environment 800. As shown in FIG. 8, vehicle 802 is traveling along a road in the direction indicated by the arrow pointing to the left. In this example, vehicle 802 has approached a non-moving obstacle 804. In the example of FIG. 8, vehicle 802 is too close to obstacle 804 to drive around obstacle 804 in a forward direction. Therefore, vehicle 802 sends a request for reversing assistance to a remote assistance system, such as remote assistance system 102 shown in FIG. 1. As discussed herein, the remote assistance system receives information from vehicle 802 regarding the vehicle's location and information (e.g., images) related to the area surrounding vehicle 802. Based on this information, a user of the remote assistance system identifies a reverse direction location footprint 806 that is accessible by vehicle 802 and will allow vehicle 802 to navigate around obstacle 804. In some examples, a valid backup region 812 is identified by a rectangle with broken lines. For example, the user of the remote assistance system may position reverse direction location footprint 806 anywhere within valid backup region 812. Information regarding the coordinates and pose of reverse direction location footprint 806 are communicated to vehicle 802.

As shown in FIG. 8, reverse direction location footprint 806 is angled with respect to the roadway lanes to allow vehicle 802 to more easily pull around obstacle 804 after stopping at reverse direction location footprint 806. For example, the angled orientation of direction location footprint 806 may reduce the amount of turning needed for vehicle 802 to drive around obstacle 804 in the forward direction.

In the example of FIG. 9, vehicle 802 has driven to the reverse direction location footprint 806 following a path 808 determined by vehicle 802 or determined by a user of the remote assistance system.

In the example of FIG. 10, vehicle 802 has stopped at the reverse direction location footprint 806. In this situation, there is enough space between vehicle 802 and obstacle 804 for vehicle 802 to safely navigate around obstacle 804. At this point, vehicle 802 calculates a path 810 from its stopped location back onto the roadway. Path 810 may be executed as soon as traffic on the roadway has cleared and vehicle 802 can safely drive back onto the roadway.

Figure 11:
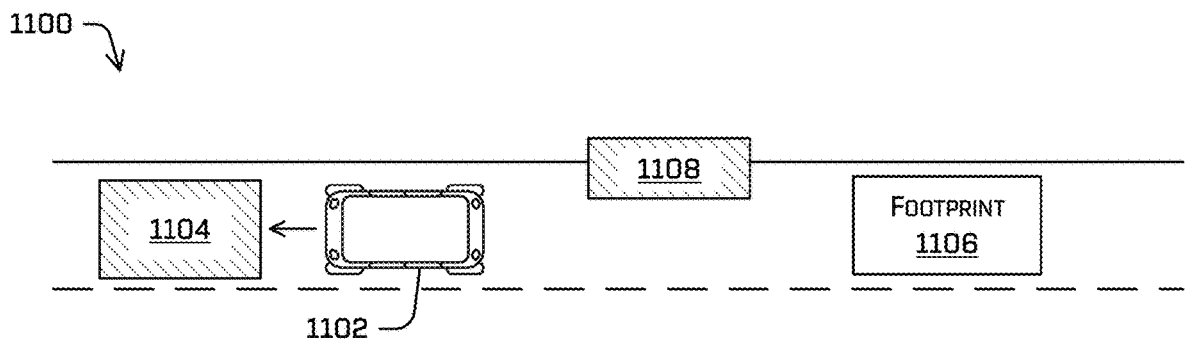
FIGS. 11-13 illustrate an example sequence of actions related to a vehicle reversing activity that includes reversing to avoid an obstacle, in accordance with examples of the disclosure.
Figure 12:
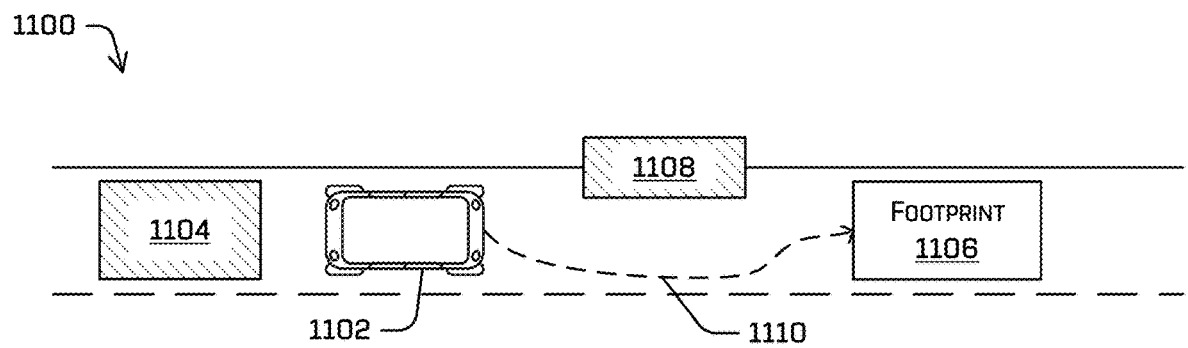
Figure 13:
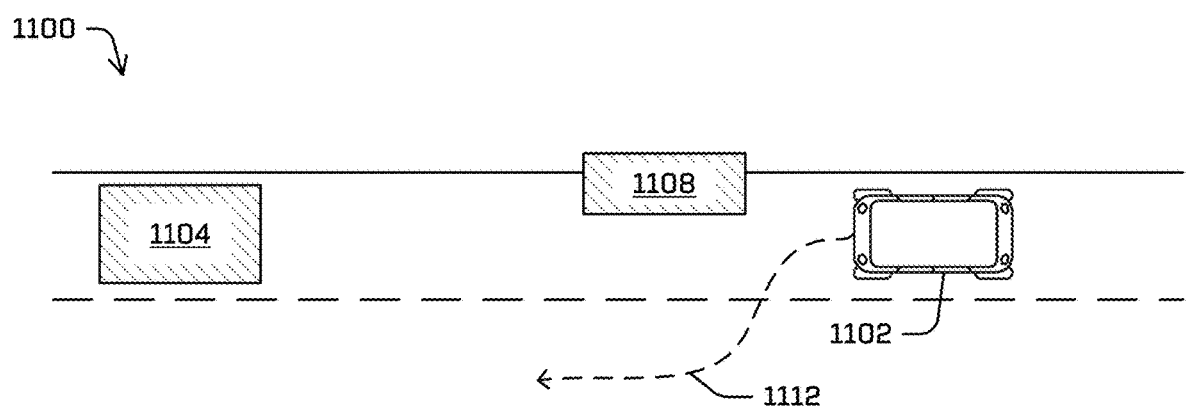

FIGS. 11-13 illustrate an example sequence of actions related to a vehicle reversing activity that includes reversing to avoid an obstacle, in accordance with examples of the disclosure.

For example, in FIG. 11 a vehicle 1102 is operating in an environment 1100. As shown in FIG. 11, vehicle 1102 is traveling along a road in the direction indicated by the arrow pointing to the left. In this example, vehicle 1102 has approached a non-moving obstacle 1104. In the example of FIG. 11, vehicle 1102 is too close to obstacle 1104 to drive around obstacle 1104 in a forward direction. Therefore, vehicle 1102 sends a request for reversing assistance to a remote assistance system, such as remote assistance system 102 shown in FIG. 1. As discussed herein, the remote assistance system receives information from vehicle 1102 regarding the vehicle's location and information (e.g., images) related to the area surrounding vehicle 1102. Based on this information, a user of the remote assistance system identifies a reverse direction location footprint 1106 that is accessible by vehicle 1102 and will allow vehicle 1102 to navigate around obstacle 1104. Information regarding the coordinates and pose of reverse direction location footprint 1106 are communicated to vehicle 1102.

In the example of FIG. 11, another obstacle 1108 is partially blocking the lane in which vehicle 1102 and footprint 1106 are located. Thus, vehicle 1102 will need to navigate around obstacle 1108 to reach footprint 1106. In some examples, vehicle 1102 may create a plan to reach footprint 1106 while navigating around obstacle 1108. In other examples, the user of the remote assistance system may provide a plan for vehicle 1102 to drive to footprint 1106 while navigating around obstacle 1108. In this example, the plan is sent from the remote assistance system to vehicle 1102. In some examples, obstacle 1108 may be a static object (e.g., a parked vehicle) or a dynamic object (e.g., a pedestrian or an animal).

In the example of FIG. 12, vehicle 1102 is planning to drive to the reverse direction location footprint 1106 following a path 1110 determined by vehicle 1102 or determined by a user of the remote assistance system.

In the example of FIG. 13, vehicle 1102 has stopped at the reverse direction location footprint 1106. In this situation, there is enough space between vehicle 1102 and obstacle 1104 for vehicle 1102 to safely navigate around obstacle 1104. At this point, vehicle 1102 calculates a path 1112 from its stopped location back onto the roadway and past obstacle 1104. Path 1112 may be executed as soon as traffic on the roadway has cleared and vehicle 1102 can safely drive back onto the roadway.

Figure 14:
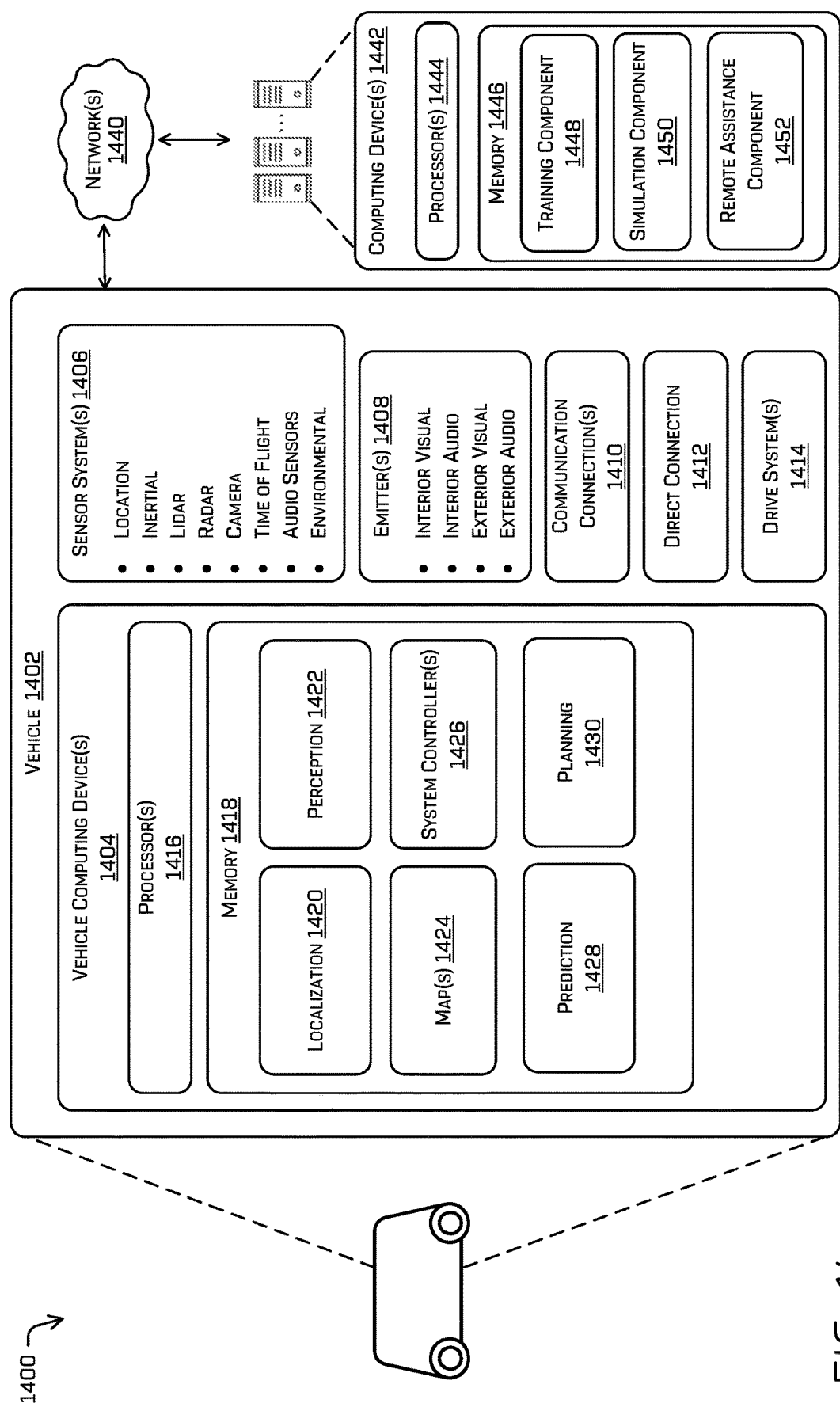
FIG. 14 is an illustration of an example system for implementing the techniques described herein.

FIG. 14 depicts a block diagram of an example system 1400 for implementing the techniques described herein. The vehicle 1402 may include one or more vehicle computing devices 1404 (also referred to as a vehicle computing device 1404 or vehicle computing device(s) 1404), one or more sensor systems 1406, one or more emitters 1408, one or more communication connections 1410, at least one direct connection 1412, and one or more drive systems 1414.

The vehicle computing device 1404 may include one or more processors 1416 and memory 1418 communicatively coupled with the one or more processors 1416. In the illustrated example, the vehicle 1402 is an autonomous vehicle; however, the vehicle 1402 could be any other type of vehicle. In the illustrated example, the memory 1418 of the vehicle computing device 1404 stores a localization component 1420, a perception component 1422, one or more maps 1424, one or more system controllers 1426, a prediction component 1428, and a planning component 1430. Though depicted in FIG. 14 as residing in memory 1418 for illustrative purposes, it is contemplated that the localization component 1420, the perception component 1422, the one or more maps 1424, the one or more system controllers 1426, the prediction component 1428, and the planning component 1430 may additionally, or alternatively, be accessible to the vehicle 1402 (e.g., stored remotely).

In at least one example, the localization component 1420 may include functionality to receive data from the sensor system(s) 1406 to determine a position and/or orientation of the vehicle 1402 (e.g., one or more of an x-, y-, z-position, roll, pitch, or yaw). For example, the localization component 1420 may include and/or request/receive a map of an environment and may continuously determine a location and/or orientation of the autonomous vehicle within the map. In some instances, the localization component 1420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 1420 may provide data to various components of the vehicle 1402 to determine an initial position of an autonomous vehicle for generating a trajectory and/or for generating or receiving map data, as discussed herein.

In some instances, the perception component 1422 may include functionality to perform object detection, segmentation, and/or classification. In some examples, the perception component 1422 may provide processed sensor data that indicates a presence of an entity that is proximate to the vehicle 1402 and/or a classification of the entity as an entity type (e.g., car, pedestrian, cyclist, animal, building, tree, road surface, curb, sidewalk, unknown, etc.). In additional or alternative examples, the perception component 1422 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The memory 1418 may further include one or more maps 1424 that may be used by the vehicle 1402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps 1424 may include at least one map (e.g., images and/or a mesh). In some examples, the vehicle 1402 may be controlled based at least in part on the map(s) 1424. In some examples, the one or more maps 1424 may be stored on a remote computing device(s) (such as the computing device(s) 1442) accessible via network(s) 1440. In some examples, multiple maps 1424 may be stored based on, for example, a characteristic (e.g., type of entity, time of day, day of week, season of the year, etc.). Storing multiple maps 1424 may have similar memory requirements but increase the speed at which data in a map may be accessed.

In at least one example, the vehicle computing device 1404 may include one or more system controllers 1426, which may be configured to control steering, propulsion, braking, safety, emitters, communication, and other systems of the vehicle 1402. These system controller(s) 1426 may communicate with and/or control corresponding systems of the drive system(s) 1414 and/or other components of the vehicle 1402.

In some examples, the prediction component 1428 may include functionality to generate one or more probability maps representing prediction probabilities of possible locations of one or more objects in an environment. For example, the prediction component 1428 can generate one or more probability maps for vehicles, pedestrians, animals, and the like within a threshold distance from the vehicle 1402. In some instances, the prediction component 1428 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the planning component 1430 may include functionality to determine a path for the vehicle 1402 to follow to traverse through an environment. For example, the planning component 1430 can determine various routes and paths and various levels of detail. In some instances, the planning component 1430 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 1430 can generate an instruction for guiding the autonomous vehicle along at least a portion of the route from the first location to the second location. In at least one example, the planning component 1430 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 1430 can alternatively, or additionally, use data from the perception component 1422 and/or the prediction component 1428 to determine a path for the vehicle 1402 to follow to traverse through an environment. For example, the planning component 1430 can receive data from the perception component 1422 and/or the prediction component 1428 regarding objects associated with an environment. Using this data, the planning component 1430 can determine a route to travel from a first location (e.g., a current location) to a second location (e.g., a target location) to avoid objects in an environment. In at least some examples, such a planning component 1430 may determine there is no such collision free path and, in turn, provide a path which brings vehicle 1402 to a safe stop avoiding all collisions and/or otherwise mitigating damage.

In some instances, aspects of some or all of the components discussed herein may include any models, algorithms, and/or machine learning algorithms. For example, in some instances, the components in the memory 1418 (and the memory 1446, discussed below) may be implemented as a neural network.

As described herein, an exemplary neural network is an algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 1406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, wheel encoders, environment sensors (e.g., temperature sensors, humidity sensors, light sensors, pressure sensors, etc.), etc. The sensor system(s) 1406 may include multiple instances of each of these or other types of sensors. For instance, the lidar sensors may include individual lidar sensors located at the corners, front, back, sides, and/or top of the vehicle 1402. As another example, the camera sensors may include multiple cameras disposed at various locations about the exterior and/or interior of the vehicle 1402. The sensor system(s) 1406 may provide input to the vehicle computing device 1404. Additionally, or alternatively, the sensor system(s) 1406 may send sensor data, via the one or more networks 1440, to the one or more computing device(s) at a particular frequency, after a lapse of a predetermined period of time, in near real-time, etc.

The vehicle 1402 may also include one or more emitters 1408 for emitting light and/or sound, as described above. The emitters 1408 in this example include interior audio and visual emitters to communicate with passengers of the vehicle 1402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 1408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 1402 may also include one or more communication connection(s) 1410 that enable communication between the vehicle 1402 and one or more other local or remote computing device(s). For instance, the communication connection(s) 1410 may facilitate communication with other local computing device(s) on the vehicle 1402 and/or the drive system(s) 1414. Also, the communication connection(s) 1410 may allow the vehicle to communicate with other nearby computing device(s) (e.g., other nearby vehicles, traffic signals, etc.). The communications connection(s) 1410 also enable the vehicle 1402 to communicate with a remote teleoperation computing device or other remote services.

The communications connection(s) 1410 may include physical and/or logical interfaces for connecting the vehicle computing device 1404 to another computing device or a network, such as network(s) 1440. For example, the communications connection(s) 1410 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 1402 may include one or more drive systems 1414. In some examples, the vehicle 1402 may have a single drive system 1414. In at least one example, if the vehicle 1402 has multiple drive systems 1414, individual drive systems 1414 may be positioned on opposite ends of the vehicle 1402 (e.g., the front and the rear, etc.). In at least one example, the drive system(s) 1414 may include one or more sensor systems to detect conditions of the drive system(s) 1414 and/or the surroundings of the vehicle 1402. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 1414. In some cases, the sensor system(s) on the drive system(s) 1414 may overlap or supplement corresponding systems of the vehicle 1402 (e.g., sensor system(s) 1406).

The drive system(s) 1414 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1414 may include a drive system controller which may receive and preprocess data from the sensor system(s) and to control operation of the various vehicle systems. In some examples, the drive system controller may include one or more processors and memory communicatively coupled with the one or more processors. The memory may store one or more components to perform various functionalities of the drive system(s) 1414. Furthermore, the drive system(s) 1414 also include one or more communication connection(s) that enable communication by the respective drive system with one or more other local or remote computing device(s).

In at least one example, the direct connection 1412 may provide a physical interface to couple the one or more drive system(s) 1414 with the body of the vehicle 1402. For example, the direct connection 1412 may allow the transfer of energy, fluids, air, data, etc. between the drive system(s) 1414 and the vehicle. In some instances, the direct connection 1412 may further releasably secure the drive system(s) 1414 to the body of the vehicle 1402.

In some examples, the vehicle 1402 may send sensor data to one or more computing device(s) 1442 via the network(s) 1440. In some examples, the vehicle 1402 may send raw sensor data to the computing device(s) 1442. In other examples, the vehicle 1402 may send processed sensor data and/or representations of sensor data to the computing device(s) 1442. In some examples, the vehicle 1402 may send sensor data to the computing device(s) 1442 at a particular frequency, after a lapse of a predetermined period of time, in near real-time, etc. In some cases, the vehicle 1402 may send sensor data (raw or processed) to the computing device(s) 1442 as one or more log files. The computing device(s) 1442 may include processor(s) 1444 and a memory 1446 storing a training component 1448, a simulation component 1450, and a remote assistance component 1452.

In some examples, the training component 1448 may include training data that has been generated by a simulator. For example, simulated training data may represent examples where testing audio sources in an environment, to provide additional training examples.

In some examples, the simulation component 1450 may simulate the operation of autonomous vehicles or other systems, as discussed herein.

In particular examples, the remote assistance component 1452 may provide various controls and interface functions associated with the pull over and reversing operations discussed herein. For example, the remote assistance component 1452 may be part of remote assistance system 102, discussed herein, or may be part of any other system or component associated with the described pull over and reversing operations.

The processor(s) 1416 of the vehicle 1402 and the processor(s) 1444 of the computing device(s) 1442 may be any suitable processor capable of executing instructions to process data and perform operations as described herein. By way of example and not limitation, the processor(s) 1416 and 1444 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 1418 and 1446 are examples of non-transitory computer-readable media. The memory 1418 and 1446 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 1418 and 1446 may include at least a working memory and a storage memory. For example, the working memory may be a high-speed memory of limited capacity (e.g., cache memory) that is used for storing data to be operated on by the processor(s) 1416 and 1444. In some instances, the memory 1418 and 1446 may include a storage memory that may be a lower-speed memory of relatively large capacity that is used for long-term storage of data. In some cases, the processor(s) 1416 and 1444 may not operate directly on data that is stored in the storage memory, and data may need to be loaded into a working memory for performing operations based on the data, as discussed herein.

It should be noted that while FIG. 14 is illustrated as a distributed system, in alternative examples, components of the vehicle 1402 may be associated with the computing device(s) 1442 and/or components of the computing device(s) 1442 may be associated with the vehicle 1402. That is, the vehicle 1402 may perform one or more of the functions associated with the computing device(s) 1442, and vice versa.

Example Clauses

A. A system comprising: one or more processors; and one or more non-transitory computer-readable media storing instructions executable by the one or more processors, wherein the instructions, when executed, cause the system to perform operations comprising: receiving, from a vehicle, an indication of an event; displaying, on a display and to a user, a portion of an environment comprising the vehicle; determining a valid region in the portion of the environment associated with a location at which the vehicle is capable of navigating; displaying, on the display, the valid region; displaying, on the display and based at least in part on a user input, a footprint of the vehicle, the footprint associated with a position and orientation; receiving, from the user, a confirmation of the footprint; and transmitting the position and orientation of the footprint to the vehicle, wherein transmitting the position and orientation to the vehicle causes the vehicle to traverse in the environment to the position and orientation.

B. The system of paragraph A, wherein the valid region comprises a region in the environment upon which the vehicle is capable of driving and is otherwise precluded from driving upon during nominal driving.

C. The system of paragraph A or B, wherein the valid region is dynamically generated as the user moves a target footprint within the portion of the environment.

D. The system of any of paragraphs A-C, the operations further comprising: displaying a plurality of candidate footprint locations in the portion of the environment.

E. The system of any of paragraphs A-D, wherein the footprint has a shape and dimensions approximating the vehicle and wherein the position is one or more of ahead of the vehicle or behind the vehicle.

F. A method comprising: receiving, from a vehicle, an indication of an event; displaying, on a display and to a user, a portion of an environment comprising the vehicle; determining a valid region in the portion of the environment associated with a location at which the vehicle is capable of navigating; displaying, on the display and based at least in part on a user input, a footprint of the vehicle, the footprint associated with a position and orientation; and transmitting the position and orientation of the footprint to the vehicle, wherein transmitting the position and orientation to the vehicle causes the vehicle to traverse in the environment to the position and orientation.

G. The method of paragraph F, wherein the valid region comprises a region in the environment upon which the vehicle is capable of driving.

H. The method of paragraph F or G, wherein the valid region is dynamically generated as the user moves a target footprint within the portion of the environment.

I. The method of any of paragraphs F-H, the operations further comprising: displaying a plurality of candidate footprints in the portion of the environment, wherein a candidate footprint allows the vehicle to pull off of a roadway.

J. The method of any of paragraphs F-I, further comprising: receiving, from the user, a confirmation of the footprint.

K. The method of any of paragraphs F-J, wherein the location of the valid region is determined from a map of an environment in which the vehicle is operating.

L. The method of any of paragraphs F-K, further comprising: automatically reducing a speed of the vehicle based at least in part on receiving the indication of the event.

M. The method of any of paragraphs F-L, further comprising: based at least in part on the event being resolved: determining a departure path for the vehicle to pull out onto a roadway; and communicating the departure path to the vehicle.

N. The method of any of paragraphs F-M, wherein the event includes an indication that the vehicle is stopped due to an obstacle, and wherein the vehicle cannot navigate around the obstacle in a forward direction.

O. The method of paragraph N, wherein determining a valid region includes identifying a region that provides space for the vehicle to navigate around the obstacle in a forward direction.

P. The method of paragraph N or O, further comprising: determining that the vehicle stopped at the footprint; and based at least in part on determining that the vehicle stopped at the footprint: determining a path for the vehicle to drive around the obstacle; and communicating the path to the vehicle.

Q. One or more non-transitory computer-readable media storing instructions that, when executed, cause one or more processors to perform operations comprising: receiving, from a vehicle, an indication of an event; displaying, on a display and to a user, a portion of an environment comprising the vehicle; determining a valid region in the portion of the environment associated with a location at which the vehicle is capable of navigating; displaying, on the display and based at least in part on a user input, a footprint of the vehicle, the footprint associated with a position and orientation; and transmitting the position and orientation of the footprint to the vehicle, wherein transmitting the position and orientation to the vehicle causes the vehicle to traverse in the environment to the position and orientation.

R. The one or more non-transitory computer-readable media of paragraph Q, the operations further comprising: displaying a plurality of candidate footprints in the portion of the environment, wherein each of the candidate footprints allow the vehicle to pull off of a roadway.

S. The one or more non-transitory computer-readable media of paragraph Q or R, wherein the event includes an indication that the vehicle is stopped due to an obstacle, and wherein the vehicle cannot navigate around the obstacle in a forward direction.

T. The one or more non-transitory computer-readable media of any of paragraphs Q-S, wherein determining a valid region includes identifying a region that provides space for the vehicle to navigate around the obstacle in a forward direction.

U. A system comprising: one or more processors; and one or more non-transitory computer-readable media storing instructions executable by the one or more processors, wherein the instructions, when executed, cause the system to perform operations comprising: transmitting, to a remote computing device, a request for guidance; receiving, from the remote computing device, coordinates of a target area for a vehicle; receiving, from the remote computing device, a target orientation of the vehicle at the target area; determining a path to the target area based on the coordinates of the target area and the target pose of the vehicle at the target area; and controlling the vehicle to: navigate the vehicle to the target area based on the path; and position the vehicle such that the vehicle stops in alignment with the target orientation.

V. The system of paragraph U, further comprising: identifying an event that involves stopping the vehicle, wherein receiving coordinates of the target area for the vehicle and receiving the target pose of the vehicle are based at least in part on the identified event.

W. The system of paragraph V, further comprising: determining that the event is resolved; and based at least in part on determining that the event is resolved: determining a path for the vehicle to pull out onto a roadway; and instructing the vehicle to execute the path.

X. The system of any of paragraphs U-W, wherein the received coordinates and target pose are associated with a target area that is located behind the vehicle.

Y. The system of any of paragraphs U-X, wherein the operations further comprise determining, as a determination to move, that the vehicle is incapable of proceeding along a path or an event necessitating the vehicle to move from a current position, and wherein transmitting the request is based at least in part on the determination to move.

Z. A method comprising: transmitting a request for guidance from a remote computing system; receiving, from the remote computing device, coordinates of a footprint in which the vehicle is capable of stopping; receiving, from the remote computing device, a target orientation associated with the footprint; determining a path to the footprint based on the coordinates of the footprint and the target pose associated with the footprint; and controlling the vehicle to: navigate the vehicle to the footprint based on the path; and position the vehicle such that the vehicle stops in alignment with the target pose.

AA. The method of paragraph Z, further comprising: identifying an event that involves stopping the vehicle, wherein receiving coordinates of the footprint and receiving the target pose associated with the footprint are based at least in part on the identified event.

AB. The method of paragraph AA, further comprising: determining that the event is resolved; and based at least in part on determining that the event is resolved: determining a path for the vehicle to pull out onto a roadway; and instructing the vehicle to execute the path.

AC. The method of paragraph AA or AB, wherein the event comprises a presence of an emergency vehicle proximate the vehicle.

AD. The method of any of paragraphs AA-AC, wherein the footprint is located at a position behind the vehicle such that the vehicle, when positioned in accordance with the footprint, is able to independently plan a path around the event causing the vehicle to stop.

AE. The method of paragraph AC, wherein the footprint is associated with an area that is otherwise precluded from being driven upon during nominal driving of the vehicle.

AF. The method of paragraph AE, further comprising: determining that the event is resolved; and based at least in part on determining that the event is resolved: determining an additional path for the vehicle to continue; and instructing the vehicle to execute the additional path.

AG. The method of any of paragraphs Z-AF, further comprising: communicating, to the remote computing device, an indication that the vehicle has stopped at the footprint.

AH. The method of any of paragraphs Z-AG, further comprising: receiving, from the remote computing device, a path for the vehicle to pull out onto a roadway; and receiving, from the remote computing device, instructions for the vehicle to follow the path.

AI. The method of any of paragraphs Z-AH, further comprising: receiving, from the remote computing device, instructions for the vehicle to reduce speed based at least in part on an event.

AJ. One or more non-transitory computer-readable media storing instructions that, when executed, cause one or more processors to perform operations comprising: determining an occurrence of an event; transmitting a request for guidance to a remote computing device; receiving, from the remote computing device, coordinates of a footprint in which the vehicle is capable of stopping, the footprint comprising a position and orientation; determining, based at least in part on the footprint, a path for the vehicle to execute to arrive at the position and obtain the orientation; and controlling the vehicle based on the path.

AK. The one or more non-transitory computer-readable media of paragraph AJ, wherein the coordinates and orientation are based at least in part on the identified event.

AL. The one or more non-transitory computer-readable media of paragraph AK, the operations further comprising: determining that the event is resolved; and based at least in part on determining that the event is resolved: determining an additional path for the vehicle to pull out onto a roadway; and instructing the vehicle to execute the additional path.

AM. The one or more non-transitory computer-readable media of any of paragraphs AJ-AL, the operations further comprising: communicating, to the remote computing device, an indication that the vehicle has stopped at the footprint.

AN. The one or more non-transitory computer-readable media of any of paragraphs AJ-AM, the operations further comprising: receiving, from the remote computing device, instructions for the vehicle to reduce speed based at least in part on an event.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein. In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving, by a remote assistance system and from a vehicle, an indication of an event;
displaying, on a display of the remote assistance system and to a user, a portion of an environment comprising the vehicle;
determining, by the remote assistance system, a valid region in the portion of the environment, the valid region associated with a location to which the vehicle is capable of navigating;
displaying, on the display of the remote assistance system, the valid region;
receiving, by the remote assistance system, first user input defining a target vehicle footprint, the target vehicle footprint associated with a target position and orientation of the vehicle within the valid region;
displaying, on the display of the remote assistance system and based at least in part on the first user input, the target vehicle footprint;
receiving, by the remote assistance system, second user input confirming the target vehicle footprint; and
transmitting the target position and orientation from the remote assistance system to the vehicle, wherein transmitting the target position and orientation to the vehicle causes the vehicle to traverse the environment to the target position and orientation.

2. The system of claim 1, wherein the valid region comprises a region in the environment upon which the vehicle is capable of driving and is otherwise precluded from driving upon during nominal driving.

3. The system of claim 1, wherein the valid region is dynamically generated as the user moves a target footprint within the portion of the environment.

4. The system of claim 1, the operations further comprising:
displaying a plurality of candidate footprint locations in the portion of the environment.

5. The system of claim 1, wherein the target vehicle footprint has a shape and dimensions approximating the vehicle and wherein the target position is one or more of ahead of a location of the vehicle or behind the location of the vehicle.

6. A method comprising:
receiving, by a remote assistance system from a vehicle, an indication of an event;
displaying, on a display of the remote assistance system and to a user, a portion of an environment comprising the vehicle;
determining, by the remote assistance system, a valid region in the portion of the environment associated with a location at which the vehicle is capable of navigating, wherein the valid region is dynamically generated as the user moves a target vehicle footprint within the portion of the environment;
receiving, by the remote assistance system, user input confirming the target vehicle footprint, the target vehicle footprint associated with a target position and orientation of the vehicle within the valid region; and
transmitting the target position and orientation of the target vehicle footprint from the remote assistance system to the vehicle, wherein transmitting the target position and orientation to the vehicle causes the vehicle to traverse in the environment to the target position and orientation.

7. The method of claim 6, wherein the valid region comprises a region in the environment upon which the vehicle is capable of driving.

8. The method of claim 6, further comprising displaying, on the display and to the user, the valid region, wherein a visual indicator of the valid region is dynamically updated to indicate whether a location of the target vehicle footprint is valid as the user moves the target vehicle footprint within the portion of the environment.

9. The method of claim 6, further comprising: displaying a plurality of candidate vehicle footprints in the portion of the environment, wherein a candidate vehicle footprint allows the vehicle to pull off of a roadway.

10. The method of claim 6:
wherein the target vehicle footprint comprises a safety buffer dimensioned about a periphery of the vehicle.

11. The method of claim 6, wherein the location of the valid region is determined from a map of the environment in which the vehicle is operating.

12. The method of claim 6, further comprising:
automatically reducing a speed of the vehicle based at least in part on receiving the indication of the event.

13. The method of claim 6, further comprising:
based at least in part on the event being resolved:
determining a departure path for the vehicle to pull out onto a roadway; and
communicating the departure path to the vehicle.

14. The method of claim 6, wherein the indication of the event is an indication that the vehicle is stopped due to an obstacle, and wherein the vehicle cannot navigate around the obstacle in a forward direction.

15. The method of claim 14, wherein determining the valid region includes identifying a region that provides space for the vehicle to navigate around the obstacle in the forward direction.

16. The method of claim 14, further comprising:
determining that the vehicle stopped at the target vehicle footprint; and
based at least in part on determining that the vehicle stopped at the target vehicle footprint:
determining a path for the vehicle to drive around the obstacle; and
communicating the path to the vehicle.

17. One or more non-transitory computer-readable media storing instructions that, when executed, cause one or more processors to perform operations comprising:
receiving, by a remote assistance system from a vehicle, an indication of an event;
displaying, on a display and to a user of the remote assistance system, a portion of an environment comprising the vehicle;
determining, by the remote assistance system, a valid region in the portion of the environment associated with a location at which the vehicle is capable of navigating, wherein the valid region is dynamically generated as the user moves a target vehicle footprint within the portion of the environment;
receiving, by the remote assistance system, user input confirming the target vehicle footprint, the target vehicle footprint associated with a target position and orientation of the vehicle within the valid region; and
transmitting the target position and orientation of the target vehicle footprint from the remote assistance system to the vehicle, wherein transmitting the target position and orientation to the vehicle causes the vehicle to traverse in the environment to the target position and orientation.

18. The one or more non-transitory computer-readable media of claim 17, the operations further comprising:
displaying a plurality of candidate footprints in the portion of the environment, wherein each of the candidate footprints allow the vehicle to pull off of a roadway.

19. The one or more non-transitory computer-readable media of claim 17, wherein the event includes an indication that the vehicle is stopped due to an obstacle, and wherein the vehicle cannot navigate around the obstacle in a forward direction.

20. The one or more non-transitory computer-readable media of claim 19, wherein determining the valid region includes identifying a region that provides space for the vehicle to navigate around the obstacle in the forward direction.

* * * * *